(12) United States Patent
Cataletto et al.

(10) Patent No.: US 12,130,469 B2
(45) Date of Patent: *Oct. 29, 2024

(54) HOLLOW-CORE FIBER CABLE AND METHOD OF MANUFACTURING THE SAME

(71) Applicant: SCIENTEL WIRELESS LLC, Lombard, IL (US)

(72) Inventors: Michael Joseph Cataletto, Palatine, IL (US); Scott Walter Snopek, Fox Lake, IL (US)

(73) Assignee: SCIENTEL WIRELESS LLC, Lombard, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/223,787

(22) Filed: Jul. 19, 2023

(65) Prior Publication Data
US 2023/0367060 A1   Nov. 16, 2023

Related U.S. Application Data

(63) Continuation of application No. 17/168,948, filed on Feb. 5, 2021, now Pat. No. 11,747,552.

(60) Provisional application No. 62/975,420, filed on Feb. 12, 2020.

(51) Int. Cl.
  *G02B 6/02*   (2006.01)
  *C03B 37/025*   (2006.01)
  *G02B 6/032*   (2006.01)

(52) U.S. Cl.
  CPC ...... *G02B 6/02347* (2013.01); *C03B 37/0256* (2013.01); *G02B 6/032* (2013.01)

(58) Field of Classification Search
  CPC .. G02B 6/02347; G02B 6/032; C03B 37/0256
  USPC .......................................................... 385/125
  See application file for complete search history.

(56) References Cited

U.S. PATENT DOCUMENTS

| | | | |
|---|---|---|---|
| 11,747,552 B1 * | 9/2023 | Cataletto | G02B 6/3807 385/125 |
| 2003/0228116 A1 * | 12/2003 | Davis | G02B 6/4438 385/109 |
| 2006/0177175 A1 * | 8/2006 | Mayer | G02B 6/4472 385/24 |
| 2006/0177187 A1 * | 8/2006 | Williams | G02B 6/02347 385/123 |
| 2012/0155807 A1 * | 6/2012 | Knapp | G02B 6/32 385/61 |

* cited by examiner

*Primary Examiner* — Jerry M Blevins
(74) *Attorney, Agent, or Firm* — Brown Rudnick LLP; Matthew P. York

(57) ABSTRACT

The invention generally relates to optical fibers, and, more particularly, to hollow-core optical fibers and cables for use in high-speed data transmission, including transmission of telecommunications data, and methods of manufacturing such hollow-core optical fibers and cables.

16 Claims, 5 Drawing Sheets

HOLLOW-CORE FIBER CABLE AND METHOD OF MANUFACTURING THE SAME

CROSS-REFERENCE TO RELATED APPLICATIONS

This application is a continuation application of U.S. Nonprovisional application Ser. No. 17/168,948, filed Feb. 5, 2021, which claims priority to, and the benefit of, U.S. Provisional Application No. 62/975,420, filed on Feb. 12, 2020, the content of each of which is incorporated by reference herein in its entirety.

FIELD OF THE INVENTION

The invention generally relates to optical fibers, and, more particularly, to hollow-core optical fibers and cables for use in high-speed data transmission and methods of manufacturing such hollow-core optical fibers and cables.

BACKGROUND

Modern communication systems increasingly rely upon fiber optic networks to carry large amounts of data between sites, as optical fibers permit transmission over longer distances and at higher bandwidths (data rates) than conventional electrical cables. Optical fibers are used instead of conventional metal wires because signals travel along optical fibers with less attenuation (transmission loss), and, in many instances, optical fibers are immune to electromagnetic interference, a drawback associated with the use of metal wires. As such, fiber optics technology plays a critical role within the telecommunications sector, due in large part to the wide-scale and growing adoption of the technology in communication and data transmission services.

Traditional optical fibers include flexible, transparent fibers made by drawing glass (silica) (or plastic) to a diameter slightly thicker than that of a human hair. An optical fiber typically includes a core surrounded by a cladding material with a lower index of refraction. Light is kept within the core by a phenomenon known as total internal reflection, which causes the fiber to act as a waveguide responsible for guiding light within the fiber. In particular, the higher-index core surrounded by the lower-index cladding is a geometry that results in the total internal reflection of radiation entering the fiber over a select range of angles.

The use of optical fibers for communication (i.e., transmitting information from one place to another) involves sending pulses of infrared light through such optical fibers. The light forms an electromagnetic carrier wave that is modulated to carry certain information (e.g., data). The two most commonly used transmission wavelength windows or bands with the lowest values of attenuation consist of a 1310 nm (nanometer) wavelength band, with a minimum loss of approximately 0.4 dB/km (decibel/kilometer), and a 1550 nm wavelength band, with a minimum attenuation of approximately 0.2 dB/km.

As a result of the lower loss and corresponding reduction in line amplification required, manufacturers have begun focusing on devices and fibers to support operation at around the 1550 nm wavelength. While there has been a trend to move toward transmission of data in the 1550 nm wavelength band, many communications systems continue to rely on the 1310 nm wavelength band for the communication and transmission of certain information, as the cost of manufacture of 1310 nm devices and fibers is much less than that of 1550 nm devices and fibers. However, conventional optical fibers, particularly for use in the 1310 nm wavelength band, suffer drawbacks. For example, some communications systems rely on solid-core fiber optics, wherein such optical fibers may suffer from low bandwidth capabilities, resulting in less than optimal data transmission and undesired latency, which is particularly burdensome in systems that require high-speed data transmission.

SUMMARY

The present invention recognizes the drawbacks of current fiber optics and provides a hollow-core optical fiber and cable configured to address such drawbacks. In particular, aspects of the invention are directed to a hollow-core optical fiber configured to support and guide the propagation of light at a wavelength of 1310 nm (nanometers) and methods of forming such a hollow-core optical fiber.

The hollow-core optical fiber includes a microstructured cladding region surrounding a hollow core region. The geometry of the hollow core and microstructured cladding regions enables the optical fiber to support and guide the propagation of light at a wavelength of 1310 nm. More specifically, unlike the solid-core optical fibers, which rely on a solid core having a higher refractive index than the surrounding cladding material in order to form the total internal reflection structure, the hollow-core optical fiber structure is configured to guide optical energy within the hollow core region by total internal reflection at an interface between the hollow core region, having a lower refractive index, and the microstructured cladding region, having a higher refractive index. The hollow-core optical fiber structure allows for the guidance of optical energy (i.e., light) without significant leakage or loss of signal that may normally occur with solid-core optical fibers. In particular, a majority (at least 99%) of the light transmitted by the hollow-core optical fiber travels in air (or other gas), providing such a fiber with a unique set of transmission properties, including lower non-linearity and lower latency when compared to the properties of solid-core optical fibers.

The present invention further provides a fiber optic cable, which includes at least one hollow-core optical fiber, configured to be used with a fiber optics network of a communications system for the transmission of telecommunications data. For example, the fiber optic cable may include at least one hollow-core optical fiber encased within a cable housing and optical fiber connectors coupled to ends of the hollow-core optical fiber and configured to operably receive and transmit light at a wavelength of 1310 nm. The optical fiber connector, for example, may include a small form factor (SFF) connector configured to mechanically couple the hollow-core optical fiber to at least one of an additional optical fiber and/or a device for transmitting and/or receiving a light signal (e.g., communications equipment or the like).

Accordingly, by providing a hollow-core optical fiber able to function within the 1310 nm optical wavelength band, the benefits of hollow-core optical fibers can be realized in communication systems operating within the 1310 nm optical wavelength band. More specifically, the hollow-core optical fiber of the present invention would reduce latency and attenuation when used in telecommunications networks and applications, thereby enhancing the speed and distance capabilities beyond current designs engineered around solid-core optical fibers. Furthermore, the fiber optic cable allows for the hollow-core optical fiber to be used with commercially available communications equipment (e.g., radios, switches, SFP Modules, etc.), and provide the advantages of a hollow-core optical fiber over the conventional solid-core optical fibers.

Certain aspects of the invention relate to a hollow-core optical fiber configured to support and guide the propagation of light at a wavelength of 1310 nm. The hollow-core optical fiber includes a microstructured cladding region and a hollow core region surrounded by the microstructured cladding region and configured to guide optical energy within the hollow core region by total internal reflection at an interface between the hollow core region and the microstructured cladding region. The hollow core and microstructured cladding regions are configured to support and guide the propagation of light at a wavelength of 1310 nm.

In some embodiments, at least the hollow core region comprises a gas or a vacuum. For example, the hollow core region may include air. In some embodiments, the hollow core region includes a lower refractive index and the microstructured cladding region includes non-coaxial regions of higher refractive index. The microstructured cladding region comprises a cladding material. In some embodiments, the cladding material is positioned substantially symmetrically around the hollow core region. For example, the cladding material may be arranged in a regularly spaced periodic array. In some embodiments, the periodic array may be configured in a polygonal lattice pattern. For example, the periodic array may be configured in a hexagonal lattice pattern.

Other aspects of the invention relate to a method of fabricating a hollow-core optical fiber. The method includes assembling and forming a preform of plurality of elongate elements, at least some of the elongate elements comprising capillaries, and drawing the preform into a hollow-core optical fiber configured to support and guide the propagation of light at a wavelength of 1310 nm. The fabricated hollow-core optical fiber includes a microstructured cladding region and a hollow core region surrounded by the microstructured cladding region and configured to guide optical energy within the hollow core region by total internal reflection at an interface between the hollow core region and the microstructured cladding region. The hollow core and microstructured cladding regions are configured to support and guide the propagation of light at a wavelength of 1310 nm.

In some embodiments, at least the hollow core region comprises a gas or a vacuum. For example, the hollow core region may include air. In some embodiments, the hollow core region includes a lower refractive index and the microstructured cladding region includes non-coaxial regions of higher refractive index. The microstructured cladding region comprises a cladding material. In some embodiments, the cladding material is positioned substantially symmetrically around the hollow core region. For example, the cladding material may be arranged in a regularly spaced periodic array. In some embodiments, the periodic array may be configured in a polygonal lattice pattern. For example, the periodic array may be configured in a hexagonal lattice pattern.

Other aspects of the invention relate to a hollow-core optical fiber configured to support and guide the propagation of light at a wavelength of 1310 nm and an optical fiber connector coupled to both ends and configured to operably receive and transmit light at a wavelength of 1310 nm. The optical fiber connector may include a small form factor (SFF) connector configured to mechanically couple the hollow-core optical fiber to at least one of an additional optical fiber and a device for transmitting and/or receiving a light signal. The hollow-core optical fiber includes a microstructured cladding region and a hollow core region surrounded by the microstructured cladding region and configured to guide optical energy within the hollow core region by total internal reflection at an interface between the hollow core region and the microstructured cladding region. The hollow core and microstructured cladding regions are configured to support and guide the propagation of light at a wavelength of 1310 nm.

In some embodiments, at least the hollow core region comprises a gas or a vacuum. For example, the hollow core region may include air. In some embodiments, the hollow core region includes a lower refractive index and the microstructured cladding region includes non-coaxial regions of higher refractive index. The microstructured cladding region comprises a cladding material. In some embodiments, the cladding material is positioned substantially symmetrically around the hollow core region. For example, the cladding material may be arranged in a regularly spaced periodic array. In some embodiments, the periodic array may be configured in a polygonal lattice pattern. For example, the periodic array may be configured in a hexagonal lattice pattern.

Other aspects of the invention relate to a fiber optic cable. The fiber optic cable includes at least one hollow-core optical fiber configured to support and guide the propagation of light at a wavelength of 1310 nm and at least one optical fiber connector coupled to both ends of the hollow-core optical fiber and configured to operably receive and transmit light at a wavelength of 1310 nm. The fiber optic cable further includes a cable housing encasing at least the hollow-core optical fiber within. The cable housing may include a durable and robust material configured for at least outdoor use. The optical fiber connector may include a small form factor (SFF) connector configured to mechanically couple the hollow-core optical fiber to at least one of an additional optical fiber and a device for transmitting and/or receiving a light signal.

In some embodiments, the hollow-core optical fiber includes a microstructured cladding region and a hollow core region surrounded by the microstructured cladding region and configured to guide optical energy within the hollow core region by total internal reflection at an interface between the hollow core region and the microstructured cladding region. The hollow core and microstructured cladding regions are configured to support and guide the propagation of light at a wavelength of 1310 nm.

In some embodiments, at least the hollow core region comprises a gas or a vacuum. For example, the hollow core region may include air. In some embodiments, the hollow core region includes a lower refractive index and the microstructured cladding region includes non-coaxial regions of higher refractive index. The microstructured cladding region comprises a cladding material. In some embodiments, the cladding material is positioned substantially symmetrically around the hollow core region. For example, the cladding material may be arranged in a regularly spaced periodic array. In some embodiments, the periodic array may be configured in a polygonal lattice pattern. For example, the periodic array may be configured in a hexagonal lattice pattern.

Other aspects of the invention relate to a method of transmitting telecommunications data. The method includes providing a hollow-core optical fiber configured to support and guide the propagation of light at a wavelength of 1310 nm, receiving a light signal comprising telecommunications data, and transmitting, via the hollow-core optical fiber, the light signal.

In some embodiments, the hollow-core optical fiber includes a microstructured cladding region and a hollow core region surrounded by the microstructured cladding region and configured to guide optical energy within the hollow core region by total internal reflection at an interface between the hollow core region and the microstructured cladding region. The hollow core and microstructured cladding regions are configured to support and guide the propagation of light at a wavelength of 1310 nm.

In some embodiments, at least the hollow core region comprises a gas or a vacuum. For example, the hollow core region may include air. In some embodiments, the hollow core region includes a lower refractive index and the microstructured cladding region includes non-coaxial regions of higher refractive index. The microstructured cladding region comprises a cladding material. In some embodiments, the cladding material is positioned substantially symmetrically around the hollow core region. For example, the cladding material may be arranged in a regularly spaced periodic array. In some embodiments, the periodic array may be configured in a polygonal lattice pattern. For example, the periodic array may be configured in a hexagonal lattice pattern.

DETAILED DESCRIPTION

Figure 1:
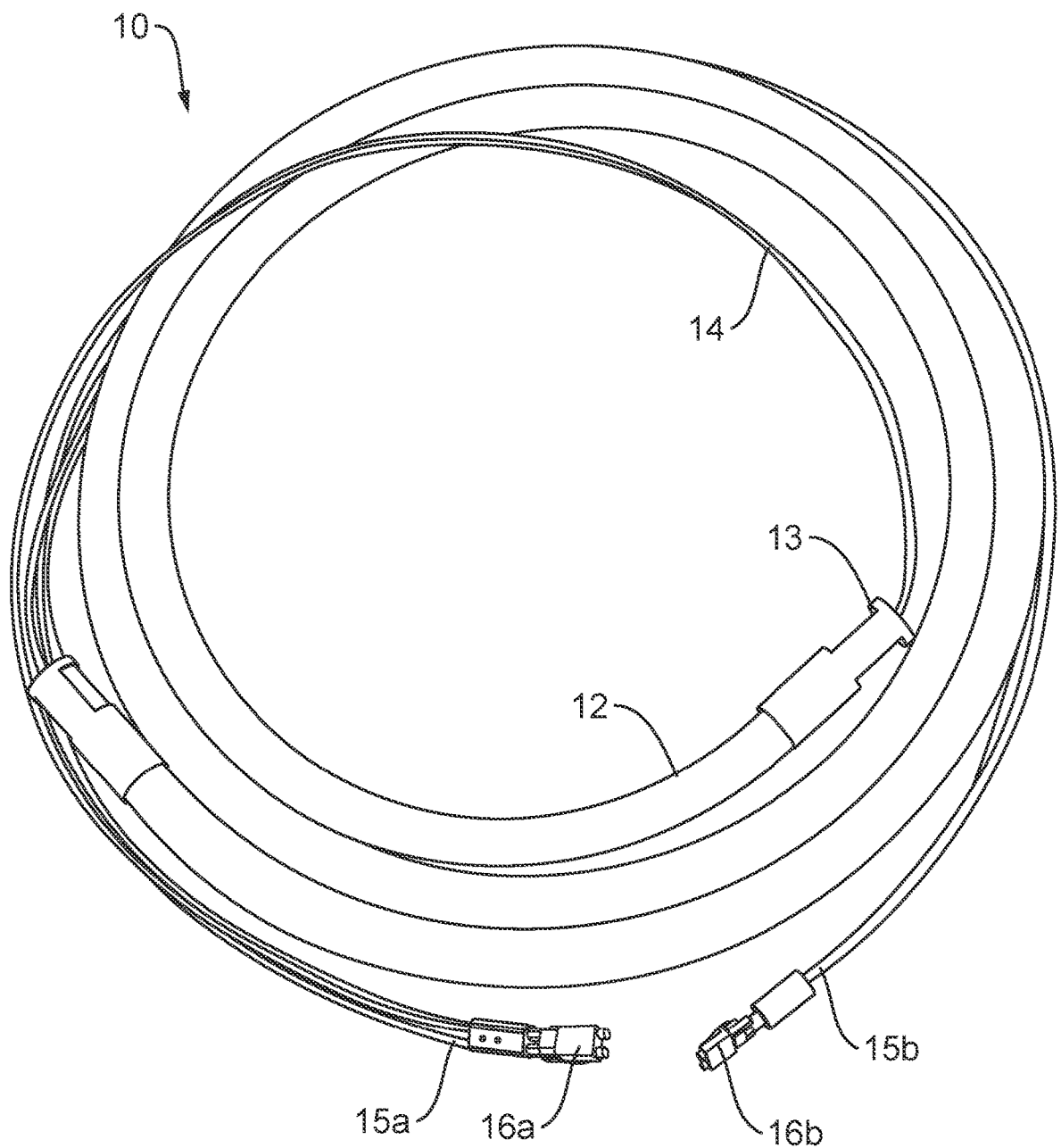
FIG. 1 illustrates an exemplary fiber optic cable including a hollow-core optical fiber consistent with the present disclosure.

The present invention is directed to hollow-core optical fibers and cables for use in high-speed data transmission, including transmission of telecommunications data. In particular, aspects of the invention are directed to a hollow-core optical fiber configured to support and guide the propagation of light at a wavelength of 1310 nm and methods of forming such a hollow-core optical fiber.

The hollow-core optical fiber includes a microstructured cladding region surrounding a hollow core region. The geometry of the hollow core and microstructured cladding regions enables the optical fiber to support and guide the propagation of light at a wavelength of 1310 nm. More specifically, unlike the solid-core optical fibers, which rely on a solid core having a higher refractive index than the surrounding cladding material in order to form the total internal reflection structure, the hollow-core optical fiber structure is configured to guide optical energy within the hollow core region by total internal reflection at an interface between the hollow core region, having a lower refractive index, and the microstructured cladding region, having a higher refractive index. The hollow-core optical fiber structure allows for the guidance of optical energy (i.e., light) without significant leakage or loss of signal that may normally occur with solid-core optical fibers. In particular, the hollow-core optical fiber reduces attenuation as compared to the solid-core optical fibers due to the fact that most of the radiation loss in a solid-core optical fiber occurs from absorption in the solid core. In particular, a majority (at least 99%) of the light transmitted by the hollow-core optical fiber travels in air (or other gas), providing such a fiber with a unique set of transmission properties, including lower non-linearity and lower latency when compared to the properties of solid-core optical fibers.

The present invention further provides a fiber optic cable, which includes at least one hollow-core optical fiber, configured to be used with a fiber optics network of a communications system for the transmission of telecommunications data. For example, the fiber optic cable may include at least one hollow-core optical fiber encased within a cable housing and optical fiber connectors coupled to ends of the hollow-core optical fiber and configured to operably receive and transmit light at a wavelength of 1310 nm. The optical fiber connector may include a small form factor (SFF) connector configured to mechanically couple the hollow-core optical fiber to at least one of an additional optical fiber and/or a device for transmitting and/or receiving a light signal.

Accordingly, by providing a hollow-core optical fiber able to function within the 1310 nm optical wavelength band, the benefits of hollow-core optical fibers can be realized in communication systems operating within the 1310 nm optical wavelength band. More specifically, the hollow-core optical fiber of the present invention would reduce latency and attenuation when used in telecommunications networks and applications, thereby enhancing the speed and distance capabilities beyond current designs engineered around solid-core fiber. Furthermore, the fiber optic cable allows for the hollow-core optical fiber to be used with commercially available communications equipment (e.g., radios, switches, SFP Modules, etc.), and provide the advantages of a hollow-core optical fiber over the conventional solid-core optical fibers.

Figure 2:
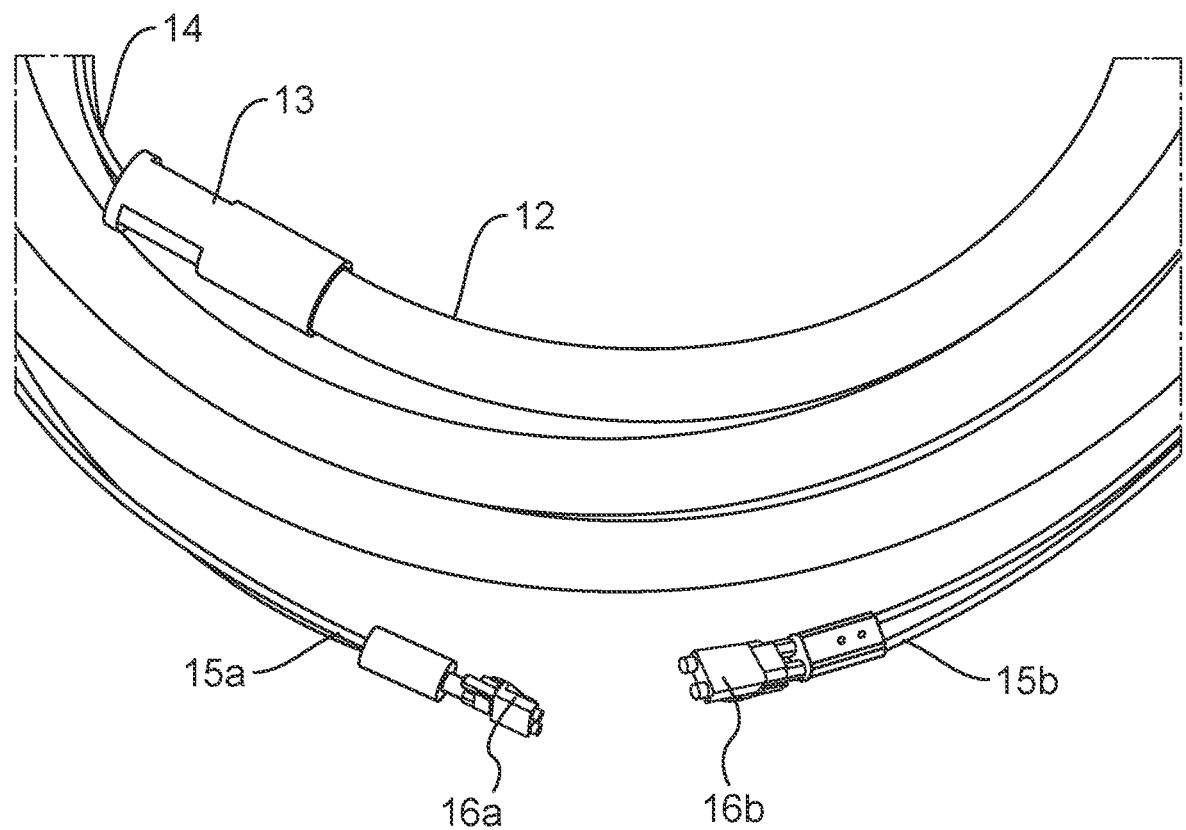
FIG. 2 is an enlarged view of the fiber optic cable of FIG. 1 illustrating components of the cable in greater detail.
Figure 3:
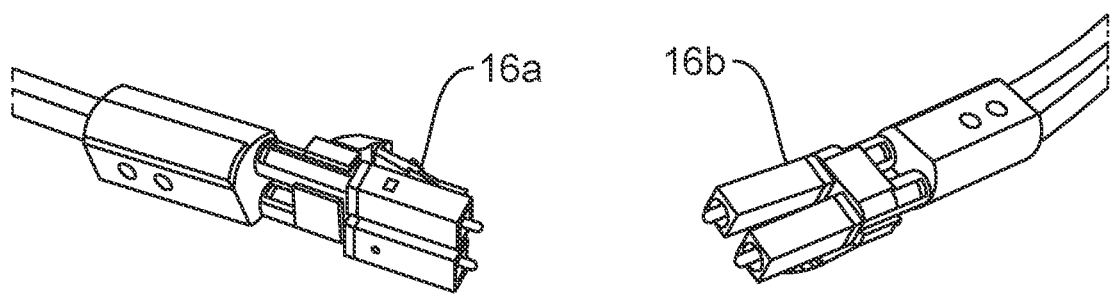
FIG. 3 is an enlarged view of the fiber optic cable of FIG. 1 illustrating the hollow-core optical fiber and optical fiber connectors in greater detail.

FIG. 1 illustrates an exemplary fiber optic cable 10 consistent with the present disclosure. FIGS. 2 and 3 are enlarged views of the fiber optic cable 10 illustrating components of the cable in greater detail. The fiber optic cable 10 includes a cable housing or outer jacket 12, at least one hollow-core optical fiber 14 housed or encased within the cable housing 12, and one or more optical fiber connectors 16 coupled to a respective end of the hollow-core optical fiber 14. For example, as shown, a first optical fiber connector 16a is coupled to a first end 15a of the hollow-core optical fiber 14 and a second optical fiber connector 16b is coupled to a second end 15b of the hollow-core optical fiber 14. The fiber optic cable 10 may include any number of optical fibers 14. For example, as illustrated, the cable 10 includes two separate hollow-core optical fibers.

The cable housing 12 may be coupled to the hollow-core optical fiber 14 by any known means (i.e., adhesive, coated, compressive fit, mechanical coupling, or the like). Furthermore, the cable 10 may include transition components along portions of the respective ends 15a, 15b of the fiber 14 so as to effectively expose or make a respective end of the fiber available for connection with either another optical fiber or communication devices or equipment, such as ferrules 13 or the like. The cable housing 12 may include one or more layers of durable and robust materials providing insulative and/or protective properties. For example, in one embodiment, the cable housing 12 may include a polyethylene (PE) material resistive to moisture and sunlight exposure, thereby allowing for the fiber optic cable 10 for outdoor use, in addition to indoor use.

As previously described herein, the hollow-core optical fiber 14 is configured to support and guide the propagation of light at a wavelength of 1310 nm. It should further be noted that the optical fiber connectors 16a, 16b are configured to operably receive and transmit light at a wavelength of 1310 nm. For example, the optical fiber connectors 16a, 16b may include a small form factor (SFF) connector configured to mechanically couple the hollow-core optical fiber 14 to at least one of an additional optical fiber and a device for transmitting and/or receiving a light signal (i.e., communications equipment or the like). Accordingly, the fiber optic cable 10 is configured to be used with a fiber optics network of a communications system operating within the 1310 nm optical wavelength band.

Figure 4:
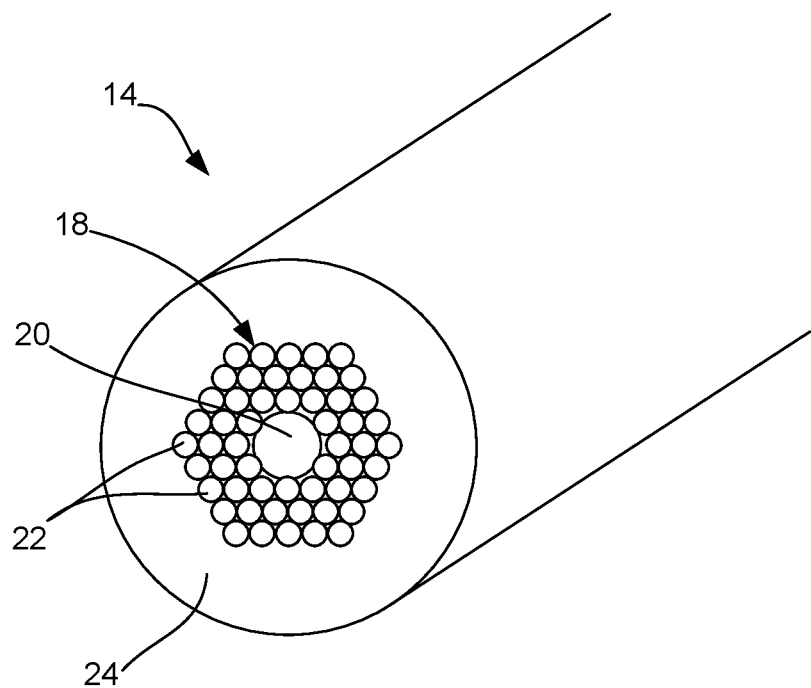
FIG. 4 is a cross-sectional view of an exemplary hollow-core optical fiber consistent with the present disclosure.

FIG. 4 is a cross-sectional view of an exemplary hollow-core optical fiber 14 consistent with the present disclosure. As shown, the fiber 14 includes a microstructured cladding region 18 and a hollow core region 20 surrounded by the microstructured cladding region 18. The optical fiber 14 is configured to guide optical energy within the hollow core region 20 by total internal reflection at an interface between the hollow core region 20 and the microstructured cladding region 18. More specifically, the hollow core region 20 and microstructured cladding region 18 are configured to support and guide the propagation of light at a wavelength of 1310 nm.

Figure 5:
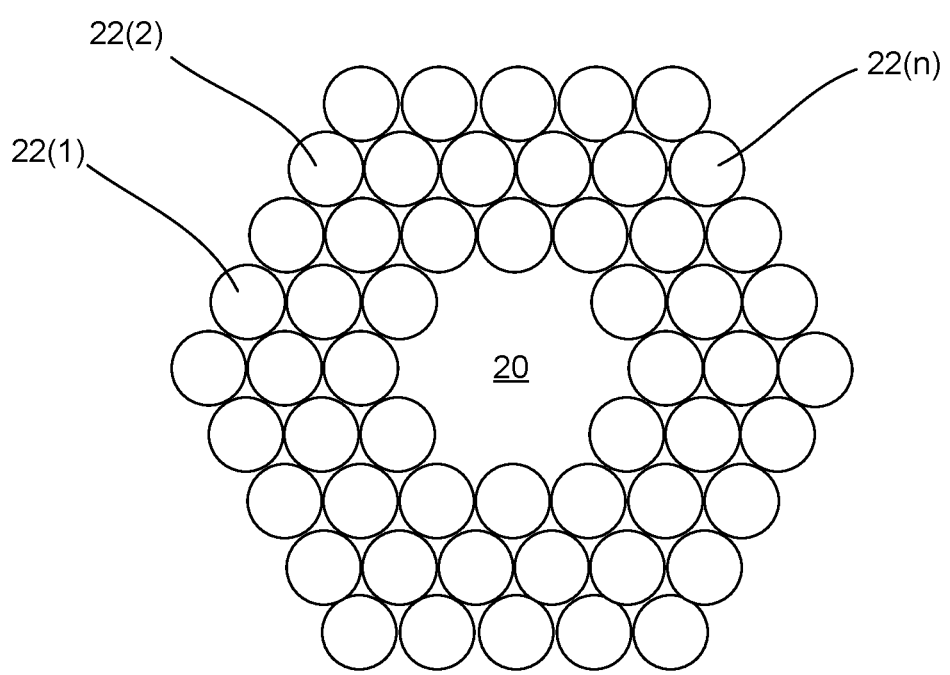
FIG. 5 is an enlarged view of a cross-section of the hollow-core optical fiber illustrating the geometry of the hollow core region and surrounding microstructured cladding region in greater detail.

FIG. 5 is an enlarged view of a cross-section of the hollow-core optical fiber 14 illustrating the geometry of the hollow core region 20 and surrounding microstructured cladding region 20 in greater detail. As used herein, a core is a physical feature having a structure that causes light to be propagated substantially within its boundary. The hollow core region 20 comprises a hollow core formed as an enlarged hole at the center of the microstructured cladding region 18. The hollow core may be formed as a hole in the material of the microstructured cladding, or may be formed as a hole in a different material. Light propagating in the fiber 14 is confined substantially to the hollow core region 20. It should be noted that, while only a single hollow core region is illustrated in figures herein, optical fibers consistent with the present disclosure may include multiple hollow core regions. Furthermore, while it may be preferable that the hollow core of the optical fiber 14 be located along the central axis of the fiber 14, the core(s) may be located at position(s) other than along the central axis of the fiber 14.

The microstructured cladding region 18 comprises a cladding material, generally in the form of elongate elements, at least some of which include capillaries 22, such as silica capillaries. The capillaries 22 are positioned substantially symmetrically relative to the hollow core region 20, wherein the hollow core region 20 is formed, for example, by omission of one or more capillaries 22 from a preform of the fiber 14, as will be described in greater detail herein. For example, as illustrated, the capillaries are arranged in a regularly spaced periodic array configured in a polygonal lattice pattern, specifically a hexagonal lattice pattern. However, it should be noted that the periodic array may take the form of any polygonal pattern, including, but not limited to, a triangle, a square, or the like.

The microstructured cladding region 18, by way of the plurality of capillaries 22, includes a plurality of holes. The holes are preferably elongated annular passages that extend substantially parallel to the longitudinal axis of the fiber 14. The diameter of the holes may be, for example, between 0.5 and 5.0 microns. The holes may be filled with a gas or another material that has a different index of refraction than the material surrounding the holes. As another alternative, there may be a vacuum within the holes.

The hollow core region 20 generally comprises a lower refractive index and the microstructured cladding region 18 comprises non-coaxial regions of higher refractive index. Accordingly, the geometry of the microstructured cladding region 18 and hollow core region 20 is configured to act as a quasi-two-dimensional photonic crystal with a photonic bandgap that allows radiation of a select frequency range to propagate down the hollow core region 20, notably the propagation of light at a wavelength of 1310 nm. In particular, light within the hollow core region 20 is effectively trapped by the photonic band gap of the surrounding material and geometry of the microstructured cladding region 18, such that the light cannot propagate away from the core but rather constrained to travel along the axis of the fiber 14, substantially confined to the hollow core region 14, as a guided mode.

Figure 6:
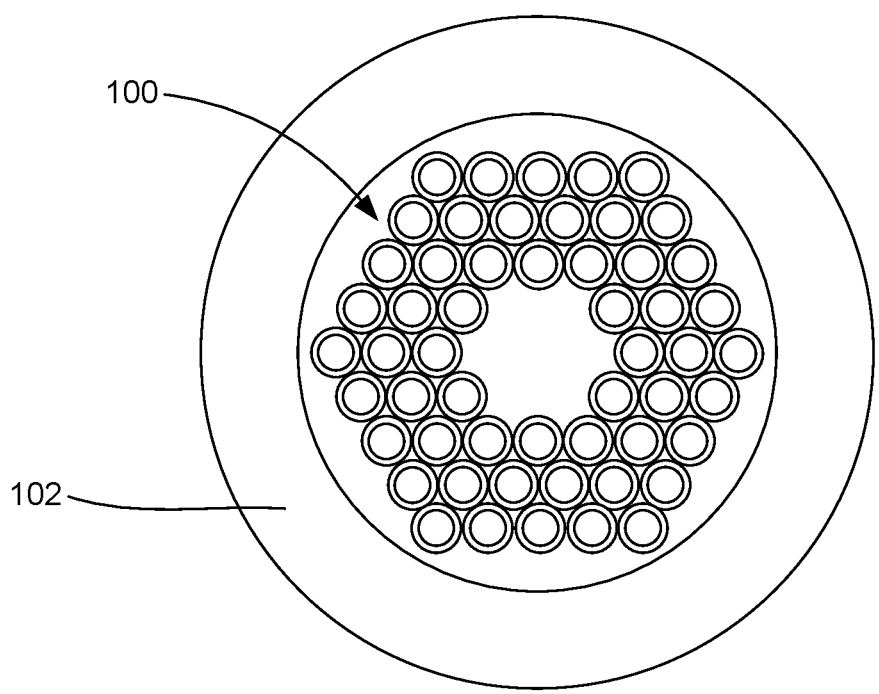
FIG. 6 shows a preform of a plurality of elongate elements in the form of capillaries suitable for use in forming a hollow-core optical fiber consistent with the present disclosure.
Figure 7:
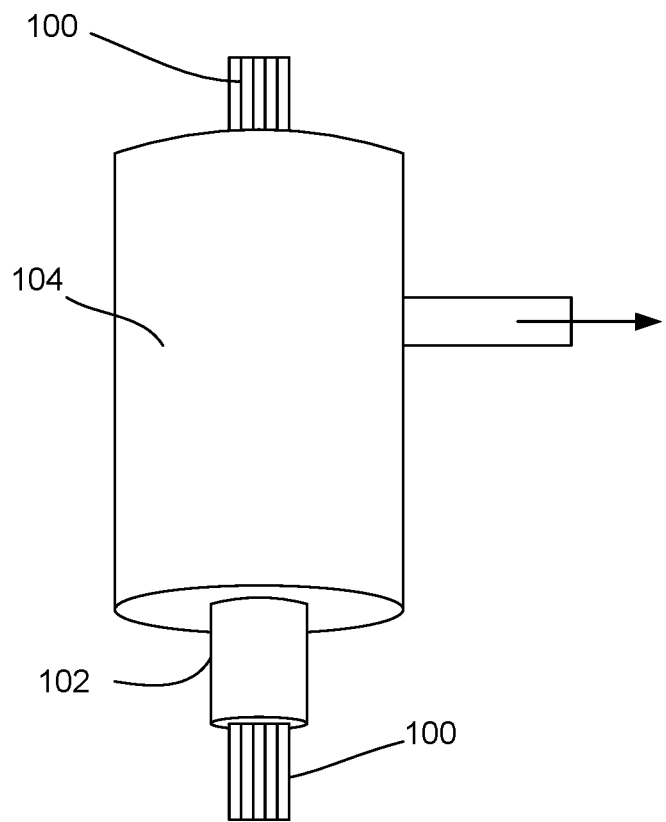
FIG. 7 illustrates and exemplary apparatus for use in fabricating a hollow-core optical fiber from the preform illustrated in FIG. 6.

FIG. 6 shows a preform of a plurality of elongate elements in the form of capillaries 100 suitable for use in forming a hollow-core optical fiber 14 consistent with the present disclosure. FIG. 7 illustrates and exemplary apparatus for use in fabricating a hollow-core optical fiber 14 from the preform illustrated in FIG. 6.

As shown, a stack of an array of capillaries 100 is placed inside a thick-walled silica glass tube 102. The silica glass tube 102 may form part of the fiber 14 after drawing, serving as an outer cladding 24 (see FIG. 4) to provide mechanical strength. During the drawing process, the inside of the tube 102 may be evacuated by sealing it within an evacuatable structure while the inside of some or all of the capillaries 100 may be kept at a different and higher pressure, for example, because they are left open to the atmosphere. The evacuatable structure may include, for example, a brass cylinder 104. Initially, it may be open at both ends. The cylinder 104 may then be sealed to the tube 102 at one end. The tube may then terminate within the brass cylinder 104. Some or all of the capillaries 100 may pass through the brass cylinder 104, which is then sealed around those capillaries that pass right therethrough at the top of the cylinder 104. The brass cylinder 104 may then be evacuated during the drawing process.

It should be noted that during the drawing process, in which the tube 102 and the capillaries 100 are drawn downwardly from the brass tube 104, the outer tube 104 does not collapse, despite being evacuated, because it has thick walls. In contrast, interstitial holes between capillaries 100, which are already smaller and have relatively thin boundaries defined by walls of the capillaries may collapse and thus may not present in the final fiber, which may be desirable). Capillaries which are evacuated will also collapse completely if there is a higher pressure around the capillary. On the other hand capillaries which are filled with atmospheric-pressure air may expand.

It should be noted that, in some embodiments, the method of fabricating a hollow-core optical fiber consistent with the present disclosure may involve individually pressurizing one or more capillaries from the preform during the drawing of the fiber 14. For example, hoses may be attached to selected ones of the plurality of capillaries 100, in which such hoses may be attached to pressure-controllers. During drawing of the fiber from the preform, the pressures inside selected capillaries, and thus the holes into which they are drawn, may be varied by varying the pressure produced by the external pressure-controllers in the hoses. Thus, in some embodiments, the holes produced in the microstructured cladding region of the drawn fiber 14 may vary in their cross-sectional areas both along the fiber and from hole to hole in fiber transverse cross-sections. It should be noted that the pressure inside any given capillary may be controlled via other means and is not limited to the use of hoses. For example, specific chambers may be used during the drawing process, in which selected exposed ends of selected capillaries may be provided within a given chamber and the pressure within such capillaries may be controlled.

Figure 8:
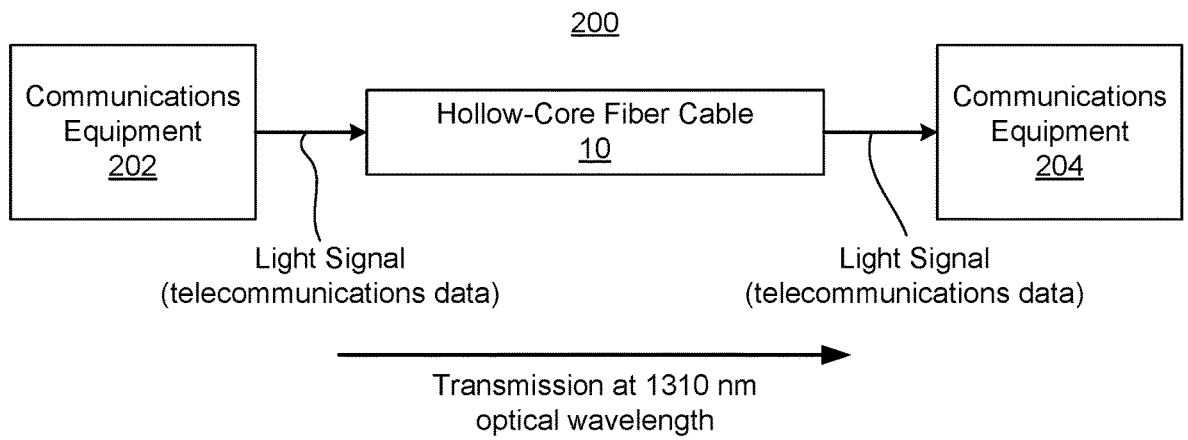
FIG. 8 is a block diagram illustrating a fiber optics network including a hollow-core fiber optic cable consistent with the present disclosure.

FIG. 8 is a block diagram illustrating a fiber optics network including a hollow-core fiber optic cable 10 consistent with the present disclosure. As previously described, the fiber optic cable 10 is configured to be used with a fiber optics network of a communications system for the transmission of telecommunications data. The fiber optic cable 10 may include at least one hollow-core optical fiber 14 encased within a cable housing and optical fiber connectors coupled to ends of the hollow-core optical fiber 14 and configured to operably receive and transmit light at a wavelength of 1310 nm. The optical fiber connector, for example, may include a small form factor (SFF) connector configured to mechanically couple the hollow-core optical fiber to at least one of an additional optical fiber and/or a device for transmitting and/or receiving a light signal (e.g., communications equipment or the like).

Accordingly, the fiber optic cable 10 may be coupled at one end to a first communications device/equipment 202 and coupled at a second end to a second communications device/equipment 204. Such devices/equipment may include, for example, radios, switches, SFP Modules, and the like. The fiber optic cable 10 is configured to receive a light signal from at least the first communications device/equipment 202 and transmit, via the hollow-core optical fiber 14, the light signal at a wavelength of 1310 nm to the second communications device/equipment 204.

Figure 9:
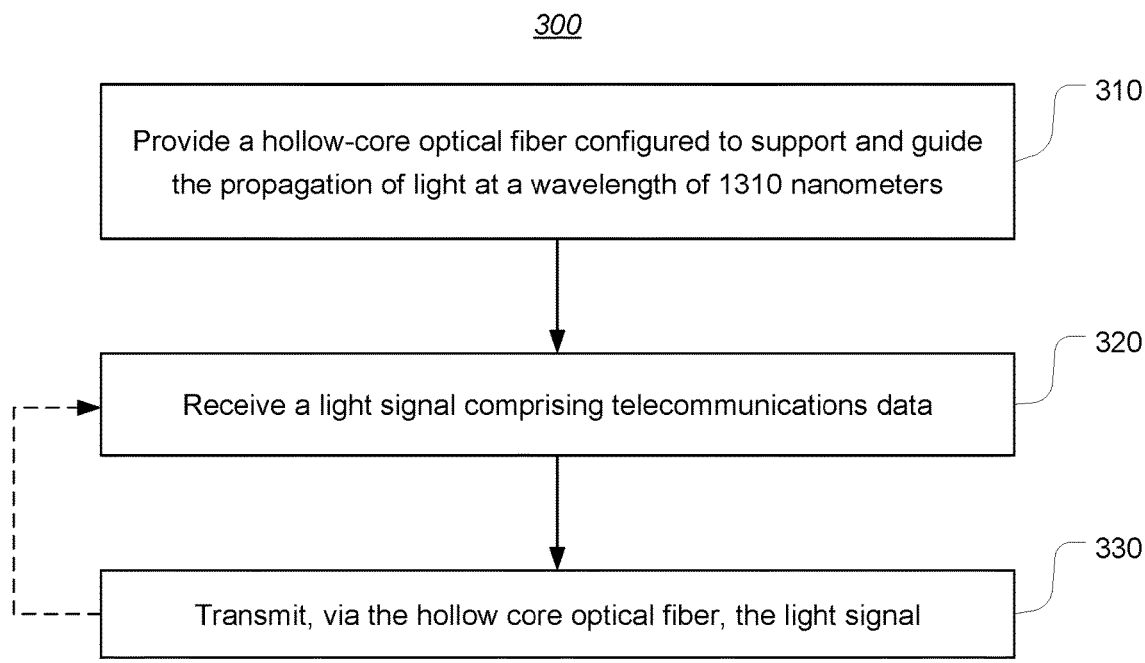
FIG. 9 is a flow diagram illustrating one embodiment of a method for transmitting telecommunications data utilizing the hollow-core optical fiber.

FIG. 9 is a flow diagram illustrating one embodiment of a method 300 for transmitting telecommunications data utilizing the hollow-core optical fiber. The method 300 includes providing a hollow-core optical fiber configured to support and guide the propagation of light at a wavelength of 1310 nanometers (operation 310). The hollow-core optical fiber includes a microstructured cladding region formed by at least some of the elongate elements and a hollow core region surrounded by the microstructured cladding region and configured to guide optical energy within the hollow core region by total internal reflection at an interface between the hollow core region and the microstructured cladding region, wherein the hollow core and microstructured cladding regions are configured to support and guide the propagation of light at a wavelength of 1310 nanometers. The method 300 further includes receiving a light signal comprising telecommunications data (operation 320). The light signal may be received from communications device/equipment or another optical fiber or other communication connection to which the hollow-core optical fiber is coupled.

The method 300 further includes transmitting, via the hollow-core optical fiber, the light signal (operation 330).

Accordingly, by providing a hollow-core optical fiber able to function within the 1310 nm optical wavelength band, the benefits of hollow-core optical fibers can be realized in communication systems operating within the 1310 nm optical wavelength band. More specifically, the hollow-core optical fiber of the present invention would reduce latency and attenuation when used in telecommunications networks and applications, thereby enhancing the speed and distance capabilities beyond current designs engineered around solid-core optical fibers. Furthermore, the fiber optic cable allows for the hollow-core optical fiber to be used with commercially available communications equipment (e.g., radios, switches, SFP Modules, etc.), and provide the advantages of a hollow-core optical fiber over the conventional solid-core optical fibers.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A hollow-core optical fiber configured to support and guide the propagation of light at a wavelength of 1310 nanometers, the hollow-core optical fiber comprising:
   a hollow core region surrounded by a microstructured cladding region,
   wherein the hollow-core optical fiber is configured to guide the propagation of light within the hollow core region by total internal reflection at an interface between the hollow core region and the microstructured cladding region such that a majority of light transmitted through the hollow-core optical fiber travels within a gas or a vacuum of the hollow core region.

2. The hollow-core optical fiber of claim 1, wherein the hollow core and microstructured cladding regions are configured to support and guide the propagation of light at a wavelength of 1310 nanometers.

3. The hollow-core optical fiber of claim 2, wherein the hollow core region comprises a lower refractive index and the microstructured cladding region comprises non-coaxial regions of higher refractive index.

4. The hollow-core optical fiber of claim 3, wherein the microstructured cladding region comprises a cladding material.

5. The hollow-core optical fiber of claim 4, wherein the cladding material is positioned substantially symmetrically around the hollow core region.

6. The hollow-core optical fiber of claim 4, wherein the cladding material is arranged in a regularly spaced periodic array.

7. The hollow-core optical fiber of claim 6, wherein the periodic array is configured in a polygonal lattice pattern.

8. The hollow-core optical fiber of claim 7, wherein the periodic array is configured in a hexagonal lattice pattern.

9. A method of fabricating a hollow-core optical fiber, the method comprising:
   assembling and forming a preform of plurality of elongate elements, at least some of the elongate elements comprising capillaries; and
   drawing the preform into a hollow-core optical fiber configured to support and guide the propagation of light at a wavelength of 1310 nanometers,
   wherein at least some of the elongate elements form a hollow core region and at least some of the elongate elements form a microstructured cladding region surrounding the hollow core region, the hollow-core optical fiber being configured to guide the propagation of light within the hollow core region by total internal reflection at an interface between the hollow core region and the microstructured cladding region such that a majority of light transmitted through the hollow-core optical fiber travels within a gas or a vacuum of the hollow core region.

10. The method of claim 9, wherein the hollow core and microstructured cladding regions are configured to support and guide the propagation of light at a wavelength of 1310 nanometers.

11. The method of claim 10, wherein the hollow core region comprises a lower refractive index and the microstructured cladding region comprises non-coaxial regions of higher refractive index.

12. The method of claim 11, wherein the microstructured cladding region comprises a cladding material.

13. The method of claim 12, wherein the cladding material is positioned substantially symmetrically around the hollow core region.

14. The method of claim 12, wherein the cladding material is arranged in a regularly spaced periodic array.

15. The method of claim 14, wherein the periodic array is configured in a polygonal lattice pattern.

16. The method of claim 15, wherein the periodic array is configured in a hexagonal lattice pattern.

* * * * *